(12) United States Patent
Tee et al.

(10) Patent No.: US 12,260,564 B2
(45) Date of Patent: Mar. 25, 2025

(54) HUMAN BODY DETECTION METHOD AND HUMAN BODY DETECTION DEVICE, AND COMPUTER READABLE STORAGE MEDIUM

(71) Applicant: BOMDIC INC., New Taipei (TW)

(72) Inventors: Leong Kian Tee, New Taipei (TW); Haoyi Chih, New Taipei (TW); En-Tzu Wang, New Taipei (TW)

(73) Assignee: BOMDIC INC., New Taipei (TW)

( * ) Notice: Subject to any disclaimer, the term of this patent is extended or adjusted under 35 U.S.C. 154(b) by 531 days.

(21) Appl. No.: 17/562,003

(22) Filed: Dec. 27, 2021

(65) Prior Publication Data

US 2023/0206472 A1 Jun. 29, 2023

(51) Int. Cl.
*G06T 7/246* (2017.01)

(52) U.S. Cl.
CPC .... *G06T 7/251* (2017.01); *G06T 2207/10028* (2013.01); *G06T 2207/20081* (2013.01); *G06T 2207/20216* (2013.01); *G06T 2207/30196* (2013.01)

(58) Field of Classification Search
CPC .......... G06T 7/251; G06T 2207/10028; G06T 2207/20081; G06T 2207/20216; G06T 2207/30196; G06V 40/103; G06V 40/20
See application file for complete search history.

(56) References Cited

U.S. PATENT DOCUMENTS

| | | | |
|---|---|---|---|
| 10,740,650 | B2 | 8/2020 | Tao et al. |
| 2014/0211994 | A1* | 7/2014 | Takenaka ............... G06V 40/10 |
| | | | 382/103 |
| 2015/0250417 | A1 | 9/2015 | Cheng et al. |
| 2020/0250408 | A1* | 8/2020 | Takeichi ............... A61B 5/1128 |
| 2023/0274580 | A1* | 8/2023 | Yao ........................ G06V 10/44 |
| | | | 382/107 |

FOREIGN PATENT DOCUMENTS

| | | |
|---|---|---|
| CA | 3052605 | 2/2020 |
| CN | 102657532 | 9/2014 |
| CN | 105849502 | 8/2016 |

(Continued)

OTHER PUBLICATIONS

"Office Action of Taiwan Counterpart Application", issued on Sep. 15, 2022, p. 1-p. 13.

*Primary Examiner* — Umair Ahsan
(74) *Attorney, Agent, or Firm* — JCIPRNET

(57) ABSTRACT

The invention provides a human body detection method, a human body detection device, and a computer readable storage medium. The method includes the following. A plurality of image frames related to a human body is obtained. A plurality of joint coordinates are detected in each image frame, and a plurality of specific image frames are accordingly found out. An image region height corresponding to the human body in each specific image frame is obtained. A first joint coordinate of a first joint in each specific image frame is obtained. A second joint coordinate of a second joint in each specific image frame is obtained. An actual length between the first joint and the second joint is estimated based on a height of the human body and the image region height, the first joint coordinate, and the second joint coordinate in each specific image frame.

14 Claims, 10 Drawing Sheets

(56) References Cited

FOREIGN PATENT DOCUMENTS

| | | | | |
|---|---|---|---|---|
| CN | 107192342 | | 9/2017 | |
| CN | 108209925 | | 6/2018 | |
| CN | 108697921 | | 10/2018 | |
| CN | 110827383 A | * | 2/2020 | ............ G06T 13/20 |
| CN | 106682051 | | 5/2020 | |
| CN | 106683070 | | 5/2020 | |
| CN | 107392097 | | 7/2020 | |
| CN | 110827383 | | 11/2020 | |
| CN | 111881731 | | 11/2020 | |
| CN | 112200165 | | 1/2021 | |
| CN | 112329513 | | 2/2021 | |
| CN | 112790758 | | 5/2021 | |
| CN | 112790758 A | * | 5/2021 | |
| CN | 113192186 | | 7/2021 | |
| CN | 113538581 | | 10/2021 | |
| TW | 202127362 | | 7/2021 | |

* cited by examiner

HUMAN BODY DETECTION METHOD AND HUMAN BODY DETECTION DEVICE, AND COMPUTER READABLE STORAGE MEDIUM

TECHNICAL FIELD

The invention relates to an image analysis technology, and particularly to a human body detection method based on images, a human body detection device, and a computer readable storage medium.

DESCRIPTION OF RELATED ART

In modern society, technology of motion detection on a user through special instruments is quite common. For example, technical means have been proposed in the existing art to obtain corresponding motion data through analyzing images of movement process of a user after obtaining these images.

In some scenarios, if an actual length between certain joints of the user can be estimated through the technology of image analysis, it should be able to further enhance accuracy of the obtained motion data and increase diversity of the calculated motion data. Therefore, for those skilled in this field, how to design a mechanism that accurately estimates the actual length between certain joints through image analysis technology is actually an important issue.

SUMMARY

In view of this, the invention provides a human body detection method, a human body detection device, and a computer readable storage medium, which serve to solve the above technical problems.

The invention provides a human body detection method, adapted for a human body detection device, and including the following. A plurality of image frames related to a human body are obtained. A plurality of joint coordinates of the human body are detected in each image frame, and a plurality of specific image frames are accordingly found out in the image frames. The human body is determined to be in a specific posture in each specific image frame. An image region height corresponding to the human body in each specific image frame is obtained. A first joint coordinate of a first joint of the human body in each specific image frame is obtained. A second joint coordinate of a second joint of the human body in each specific image frame is obtained. An actual length between the first joint and the second joint is estimated based on a height of the human body and the image region height, the first joint coordinate, and the second joint coordinate in each specific image frame.

The invention provides a human body detection device, including an image capturing circuit and a processor. The image capturing circuit is used to obtain a plurality of image frames related to a human body. The processor is coupled to the image capturing circuit and is configured to: detect a plurality of joint coordinates of the human body in each image frame, and accordingly find out a plurality of specific image frames in the image frames, where the human body is determined to be in a specific posture in each specific image frame; obtain an image region height corresponding to the human body in each specific image frame; obtain a first joint coordinate of a first joint of the human body in each specific image frame; obtain a second joint coordinate of a second joint of the human body in each specific image frame; and estimate an actual length between the first joint and the second joint based on a height of the human body and the image region height, the first joint coordinate, and the second joint coordinate in each specific image frame.

The invention provides a computer readable storage medium. The computer readable storage medium records an executable computer program. The executable computer program is loaded by a human body detection device to perform the following steps. A plurality of joint coordinates of the human body are detected in each image frame, and a plurality of specific image frames are accordingly found out in the image frames. The human body is determined to be in a specific posture in each specific image frame. An image region height corresponding to the human body in each specific image frame is obtained. A first joint coordinate of a first joint of the human body in each specific image frame is obtained. A second joint coordinate of a second joint of the human body in each specific image frame is obtained. An actual length between the first joint and the second joint is estimated based on a height of the human body and the image region height, the first joint coordinate, and the second joint coordinate in each specific image frame.

DESCRIPTION OF THE EMBODIMENTS

Figure 1:
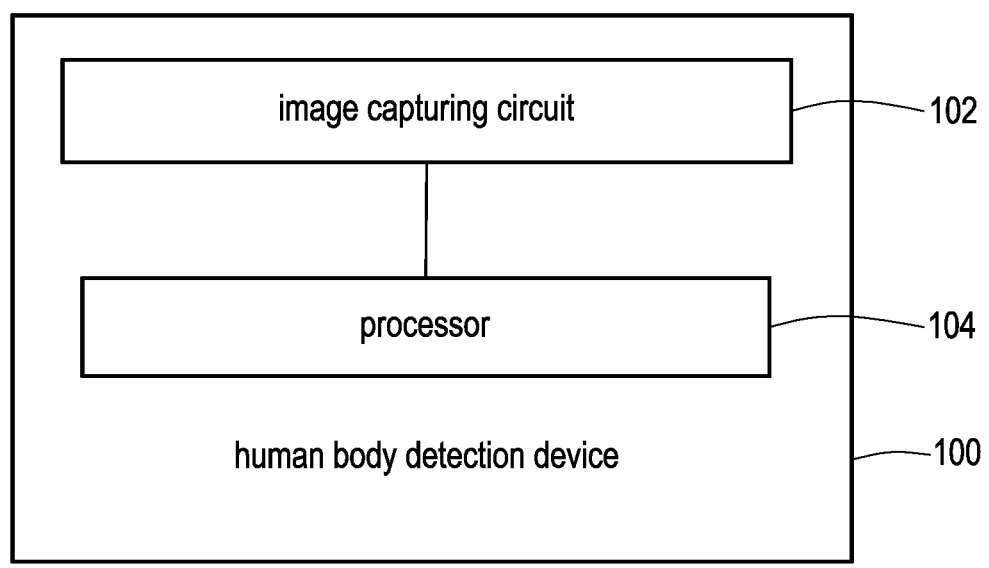
FIG. 1 is a schematic diagram of a human body detection device illustrated according to an embodiment of the invention.

With reference to FIG. 1, FIG. 1 is a schematic diagram of a human body detection device illustrated according to an embodiment of the invention. In different embodiments, a human body detection device 100 may be realized as electronic devices in various forms, for example, smart devices/computer devices in various forms, including but not limited to smart phones, tablet computers, notebook computers, smart glasses, and cameras.

In FIG. 1, the human body detection device 100 includes an image capturing circuit 102 and a processor 104. The image capturing circuit 102 may be any camera with a charge coupled device (CCD) lens, a complementary metal oxide semiconductor transistor (CMOS) lens, or an infrared lens.

The processor 104 is coupled to the image capturing circuit 102, and may be a general purpose processor, special purpose processor, traditional processor, digital signal processor, multiple microprocessors, one or more microprocessors combined with a digital signal processor core processor, controller, microcontroller, application specific integrated circuit (ASIC), field programmable gate array (FPGA), any other type of integrated circuit, state machine, Advanced RISC Machine (ARM) processor, and the like.

In the embodiment of the invention, the processor 104 may access a specific module or programming code to realize the human body detection method proposed by the invention. Briefly speaking, the method of the invention may be used to estimate an actual length between a first joint (e.g., the wrist joint) and a second joint (e.g., the shoulder joint) of a human body A to thereby facilitate subsequent motion detection (e.g., on push-ups). In other embodiments, estimating an actual length between other first and second joints may be used for other motion detection. For example, the length between the hip joint (or the shoulder joint) and the ankle joint may be used for squats, the length between the shoulder joint and the hip joint may be used for sit-ups, and the length between the elbow joint and the shoulder joint may be used for pull-ups. Nonetheless, the invention is not limited thereto. Specifics of the method of the invention will be described in detail below.

Figure 2:
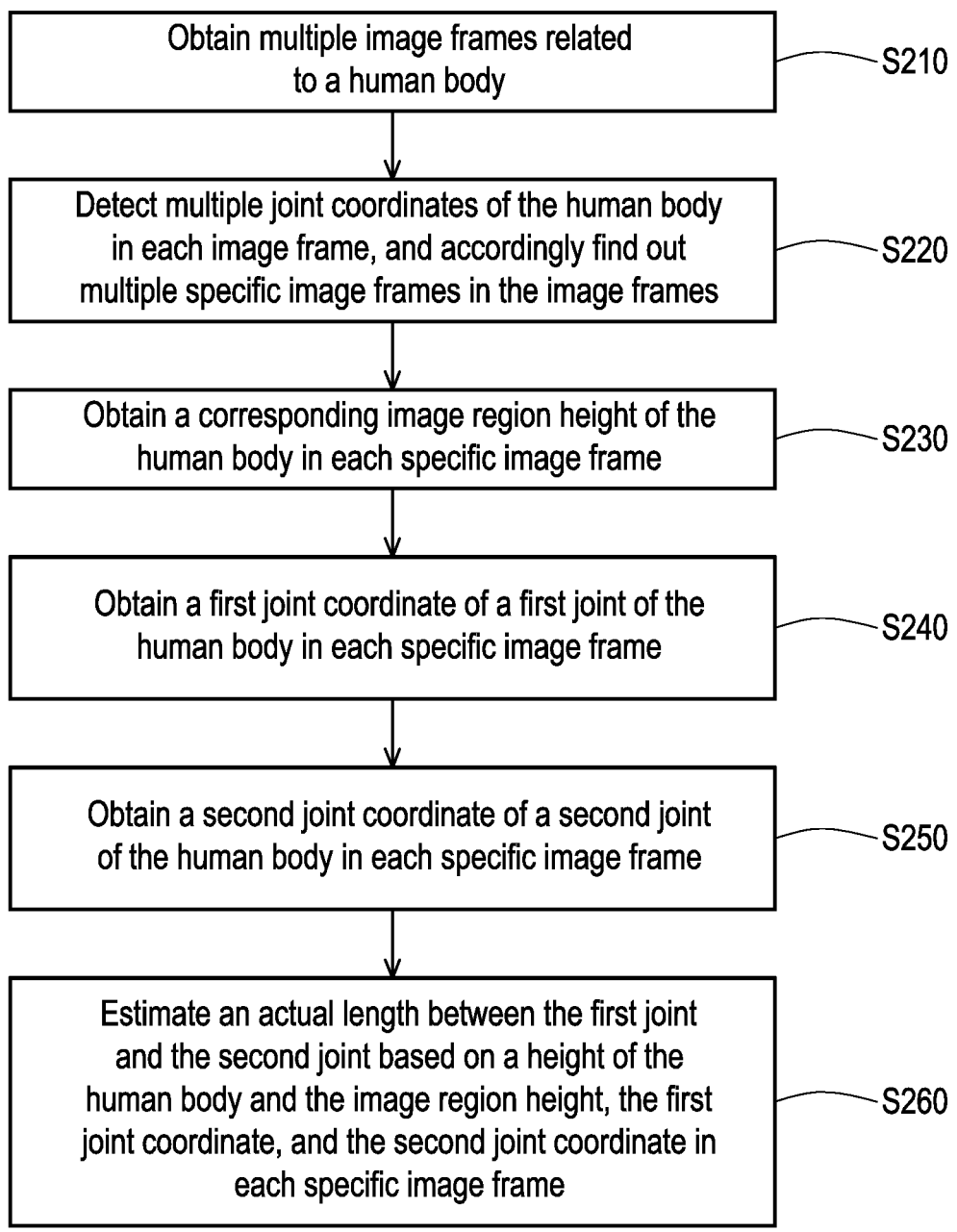
FIG. 2 is a flowchart of a human body detection method illustrated according to an embodiment of the invention.

With reference to FIG. 2, FIG. 2 is a flowchart of a human body detection method illustrated according to an embodiment of the invention. The method of this embodiment may be performed by the human body detection device 100 of FIG. 1. Details of each step of FIG. 2 accompanied with the elements shown in FIG. 1 will now be described below.

First, in step S210, the image capturing circuit 102 obtains a plurality of image frames related to the human body A. In an embodiment, the human body A is, for example, a body of a user to be detected by the human body detection device 100. The image capturing circuit 102 may, for example, shoot several images of the human body A as the image frames according to a corresponding image capturing frame rate. Nonetheless, the invention is not limited thereto.

In an embodiment, the human body detection device 100 may be fixedly disposed at a certain position, for example. The user may move into a current image capturing range of the image capturing circuit 102, for the image capturing circuit 102 to obtain the image frames. Nonetheless, the invention is not limited thereto.

After that, in step S220, the processor 104 detects a plurality of joint coordinates of the human body A in each image frame, and accordingly finds out a plurality of specific image frames in the image frames.

Figure 3A:
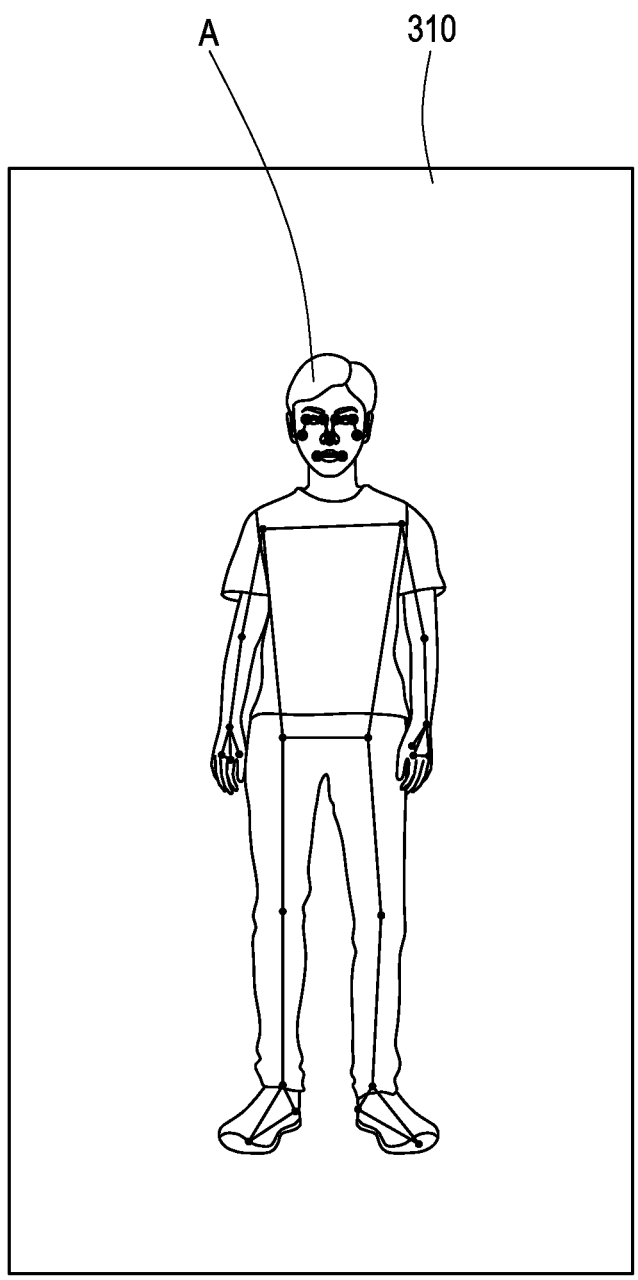
FIG. 3A to FIG. 3C are schematic diagrams of analyzing an image frame illustrated according to an embodiment of the invention.
Figure 3B:
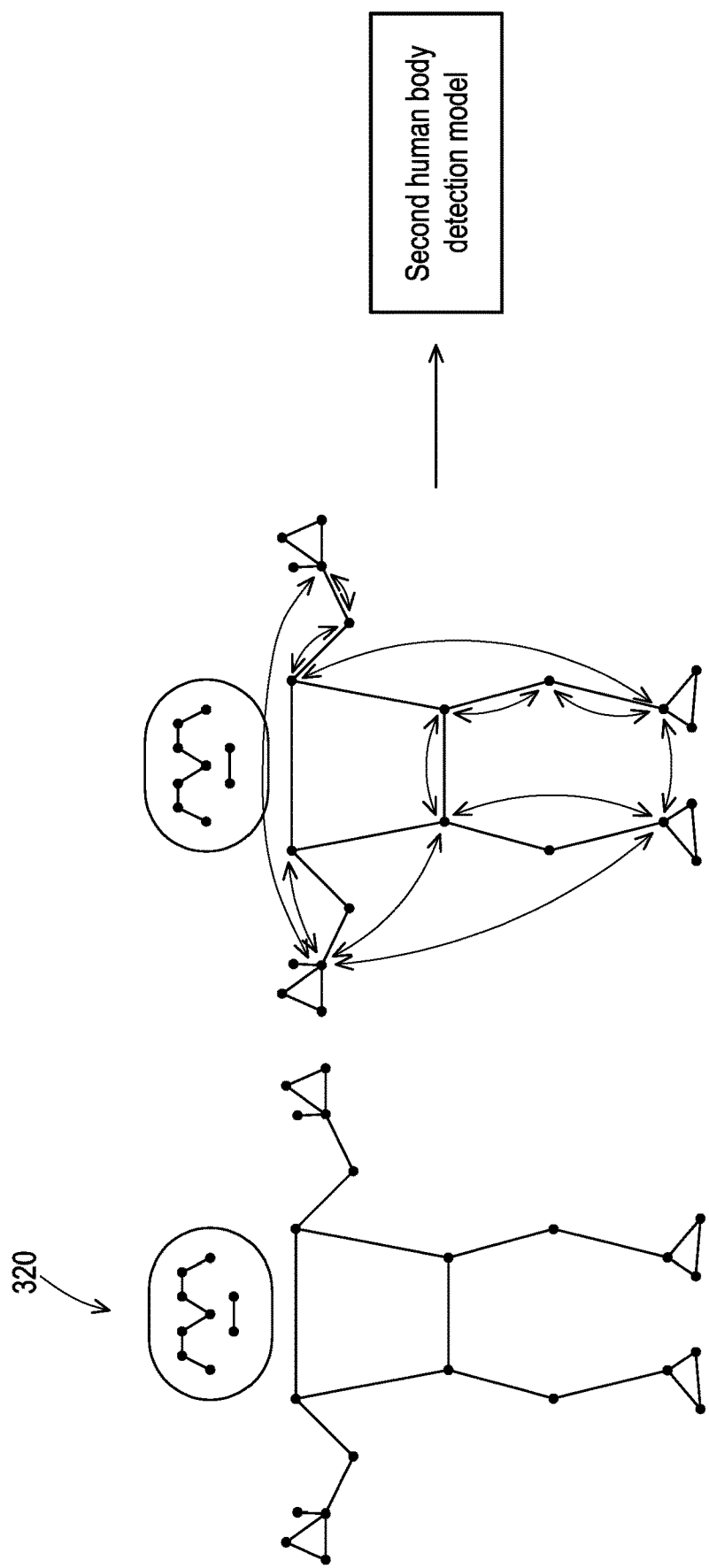
Figure 3C:
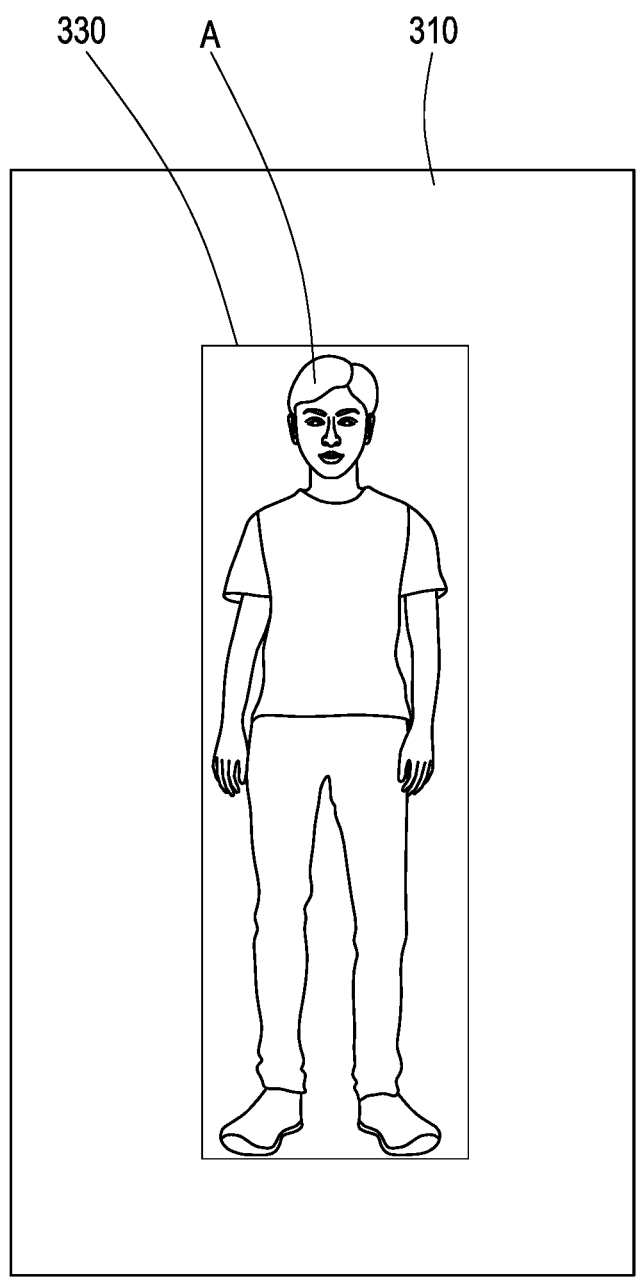

In an embodiment, the processor 104 may input one of the image frames (hereinafter referred to as a first image frame) into at least one pre-trained human body detection model (e.g., neural networks/deep learning models in various forms). The at least one human body detection model may detect the joint coordinates of the human body A in the first image frame, and accordingly output a probability that the human body A is in a specific posture in the first image frame. In addition, to make the above concepts more comprehensible, further description with the aid of FIG. 3A to FIG. 3C will be made below. FIG. 3A to FIG. 3C are schematic diagrams of analyzing an image frame illustrated according to an embodiment of the invention.

In FIG. 3A, assuming that an image frame 310 is one of the image frames obtained by the image capturing circuit 102 from the human body A, then the processor 104 may, for example, detect a skeleton of the human body A (which is represented by the dots and the line segments connected between the dots shown in the image frame 310) through a first human body detection model, and accordingly obtain the joint coordinates of the joints on the skeleton (i.e., the dots on the skeleton) in the image frame 310. In an embodiment, the first human body detection model may be realized, for example, as MediapPipe Pose, Openpose, or other similar posture detection models, but not limited thereto.

After that, the processor 104 may input the joint coordinates into a second human body detection model. The second human body detection model may, for example, be used to output a probability that the human body A is in the specific posture in the image frame 310. For ease of description, it is assumed in the following that the specific posture taken into consideration is a natural standing posture presented by the human body A in FIG. 3, but not limited thereto.

In FIG. 3B, assuming that the joint coordinates obtained by the first human body detection model are as shown in a skeleton diagram 320, then the second human body detection model may determine the probability that the human body corresponding to the skeleton diagram 320 is in the specific posture (e.g., the natural standing posture) based on the relative position between the joint coordinates, for example.

In an embodiment, in order for the second human body detection model to have the above capabilities, during training of the second human body detection model, the designer may feed specially designed training data into the second human body detection model for the second human body detection model to perform learning accordingly. For example, after obtaining a certain set of joint coordinates (obtained from, for example, a skeleton diagram from detecting a human body in a specific posture) marked as corresponding to the specific posture (e.g., the natural standing posture), the processor 104 may generate a corresponding feature vector based on the relative position between the joint coordinates, and feed the feature vector into the second human body detection model. Thereby, the second human body detection model can learn relevant features regarding the specific posture from the feature vector. In this case, after the second human body detection model receives a feature vector corresponding to a certain human body posture in the future, the second human body detection model may accordingly determine the probability that the posture of the human body is the specific posture. Nonetheless, the invention is not limited thereto.

In an embodiment, in response to determining that the probability output by the second human body detection model in response to the first image frame is higher than a probability threshold (e.g., 60%), the processor 104 may determine that the first image frame belongs to the specific image frames. In addition, in response to determining that the probability output by the second human body detection model in response to the first image frame is not higher than the probability threshold, the processor 104 may determine that the first image frame does not belong to the specific image frames.

In brief, the processor 104 may determine one or more image frames including the human body in the specific posture in the image frames to be the specific image frames, but is not limited thereto.

In an embodiment, the processor 104 may maintain a queue including N storage locations (where N is a positive integer). A first storage location to an $N^{th}$ storage location of the queue may be respectively used to store indicators of an $i^{th}$ image frame to an $i+N-1^{th}$ image frame. In an embodiment, the indicator may, for example, be used to indicate whether the corresponding image frame is specific image frames.

For example, if the processor 104 determines that the $i^{th}$ image frame belongs to the specific image frames, then the processor 104 may, for example, set the indicator at the first storage location of the queue to a first value (e.g., 1) to indicate that the $i^{th}$ image frame is one of the specific image frames. In addition, if the processor 104 determines that the $i^{th}$ image frame does not belong to the specific image frames, then the processor 104 may, for example, set the indicator at the first storage location of the queue to a second value (e.g., 0) to indicate that the $i^{th}$ image frame is not a specific image frame.

For another example, if the processor 104 determines that the $i+N-1^{th}$ image frame belongs to the specific image frames, then the processor 104 may, for example, set the indicator at the $N^{th}$ storage location of the queue to the first value (e.g., 1) to indicate that the $i+N-1^{th}$ image frame is one of the specific image frames. In addition, if the processor 104 determines that the $i+N-1^{th}$ image frame does not belong to the specific image frames, then the processor 104 may, for example, set the indicator at the $N^{th}$ storage location of the queue to the second value (e.g., 0), to indicate that the $i+N-1^{th}$ image frame is not a specific image frame.

After obtaining one or more specific image frames from the image frames, in step S230, the processor 104 obtains a corresponding image region height of the human body A in each specific image frame.

In FIG. 3C, assuming that the human body A in the image frame 310 is determined to be in the specific posture, then the processor 104 may determine the image frame 310 to be one specific image frame. In an embodiment, the processor 104 may use a bounding box 330 to frame an image region of the human body A in the image frame 310, and then take a height of the bounding box 330 as the image region height of the human body A in the image frame 310. Based on similar concepts, the processor 104 may define a corresponding bounding box in each specific image frame, and accordingly determine the image region height corresponding to each specific image frame. In an embodiment, assuming that the number of specific image frames is K (e.g., K image frames in the $i^{th}$ image frame to the $i+N-1^{th}$ image frame belong to the specific image frames), then the processor 104 may obtain K image region heights in total. Nonetheless, the invention is not limited thereto.

As mentioned earlier, the method of the invention may be used to determine the actual length between the first joint and the second joint of the human body A. The designer may select any two joints of the human body A as the first joint and the second joint depending on requirements. Nonetheless, the invention is not limited thereto.

Based on this, in step S240, the processor 104 obtains a first joint coordinate of the first joint of the human body A in each specific image frame. For example, assuming that the first joint taken into consideration is the wrist joint of the human body A, then the processor 104 may, for example, obtain the joint coordinate of the wrist joint of the human body A in each specific image frame as the first joint coordinate. Assuming that the number of specific image frames is K, then the processor 104 may obtain K first joint coordinates in total. Nonetheless, the invention is not limited thereto.

In addition, in step S250, the processor 104 obtains a second joint coordinate of the second joint of the human body A in each specific image frame. For example, assuming that the second joint taken into consideration is the shoulder joint of the human body A, then the processor 104 may, for example, obtain the joint coordinate of the shoulder joint of the human body A in each specific image frame as the second joint coordinate. Assuming that the number of specific image frames is K, then the processor 104 may obtain K second joint coordinates in total. Nonetheless, the invention is not limited thereto.

After that, in step S260, the processor 104 estimates the actual length between the first joint and the second joint based on a height of the human body A and the image region height, the first joint coordinate, and the second joint coordinate in each specific image frame.

In an embodiment, between step S220 and step S260, the processor 104 may first determine whether the human body A has been stable in the specific posture (e.g., has been stable in the natural standing posture) through a certain mechanism. For example, the processor 104 may first obtain a specific ratio of the specific image frames to the image frames, and determine whether the specific ratio is higher than a ratio threshold (e.g., 80%).

In an embodiment, the processor 104 may determine the specific ratio based on the content of the queue. For example, the processor 104 may divide the number of indicators whose value is the first value in the queue by the length of the queue (i.e., N) to estimate the specific ratio. Nonetheless, the invention is not limited thereto.

In an embodiment, in response to determining that the specific ratio is higher than the ratio threshold, the processor 104 may subsequently perform step S260. In addition, in response to determining that the specific ratio is not higher than the ratio threshold, the processor 104 may re-determine the specific image frames.

In an embodiment, during re-determining of the specific image frames, the processor 104 may take an $i+1^{th}$ image frame to an $i+N^{th}$ image frame as the image frames taken into consideration in step S210, and perform step S220 again to find out specific image frames in the $i+1^{th}$ image frame to the $i+N^{th}$ image frame. After that, the processor 104 may determine whether a current specific ratio is higher than the ratio threshold. If yes, steps S220 to S260 may subsequently be performed. In the opposite case, the processor 104 may perform the above-mentioned re-determining of the specific image frames again, which will not be repeatedly described here. In an embodiment, for the $i+1^{th}$ image frame to the $i+N^{th}$ image frame, if it is determined that the specific ratio is not higher than the ratio threshold, the processor 104 may take an $i+1^{th}$ (i.e., $i+1+1^{th}$) image frame to an $i+N+1^{th}$ image frame as the image frames taken into consideration in step S210, to re-determine whether a specific ratio of the specific image frames is not higher than the ratio threshold.

In brief, before performing step S260, the processor 104 may first determine whether the human body A has been stable in the specific posture. If yes, step S260 may subsequently be performed. In the opposite case, the above-mentioned re-determining of the specific image frames is required to be repeated until it is determined that the human body A has been stable in the specific posture. Nonetheless, the invention is not limited thereto.

In an embodiment, the height of the human body A is, for example, the real height of the human body A in the real world, and it may be provided to the human body detection device 100 by the user to be tested, input to the human body detection device 100 by relevant personnel in place of the user, obtained from a database by the human body detection device 100 according to data of the user, or obtained by the human body detection device 100 using specific camera hardware and height calculation programs. Nonetheless, the invention is not limited thereto.

In an embodiment, during step S260, the processor 104 may be configured to: obtain an average height of the image region height (e.g., an average value of the K image region heights) in each specific image frame; obtain a first average coordinate of the first joint coordinate (e.g., an average coordinate of the K first joint coordinates) in each specific image frame; obtain a second average coordinate of the second joint coordinate (e.g., an average coordinate of the K second joint coordinates) in each specific image frame; and estimate the actual length between the first joint and the second joint based on the height of the human body A, the average height, the first average coordinate, and the second average coordinate.

In an embodiment, the actual length between the first joint and the second joint may be represented as $$"L_{1,2} = \frac{D(P1_{av}, P2_{av})}{H_{av}} \times UH",$$

where $P1_{av}$ is the first average coordinate, $P2_{av}$ is the second average coordinate, $H_{av}$ is the average height, UH is the height of the human body A, and $D(P1_{av}, P2_{av})$ is a distance (e.g., an Euclidean distance) between the first average coordinate and the second average coordinate.

It can be seen from the above that in the method of the invention, after the human body A is determined to be stable in the specific posture (e.g., the natural standing posture or other postures required by the designer), the actual length between the first and second joints may be accordingly estimated. Thereby, subsequent detection on various motions of the human body can be made more accurate, and the effect of detection can be enhanced.

In an embodiment, the actual length between the first joint and the second joint obtained by the method taught by the above embodiments may, for example, be used to estimate a three-dimensional movement speed of performing a specific action by the human body A, which will be further described below.

In an embodiment, to achieve the above, the invention also proposes a method that allows the human body detection device 100 to determine whether the human body A has performed one repetition count of the specific action. For ease of description, it is assumed in the following that the specific action taken into consideration is push-ups, but implementation of the invention is not limited thereto. In other embodiments, based on the following teachings, those ordinarily skilled in this field should be accordingly able to understand detection operations corresponding to other specific actions, such as squats, sit-ups, crunches, and pull-ups, among other weight training actions with equipment or freehand.

Figure 4:
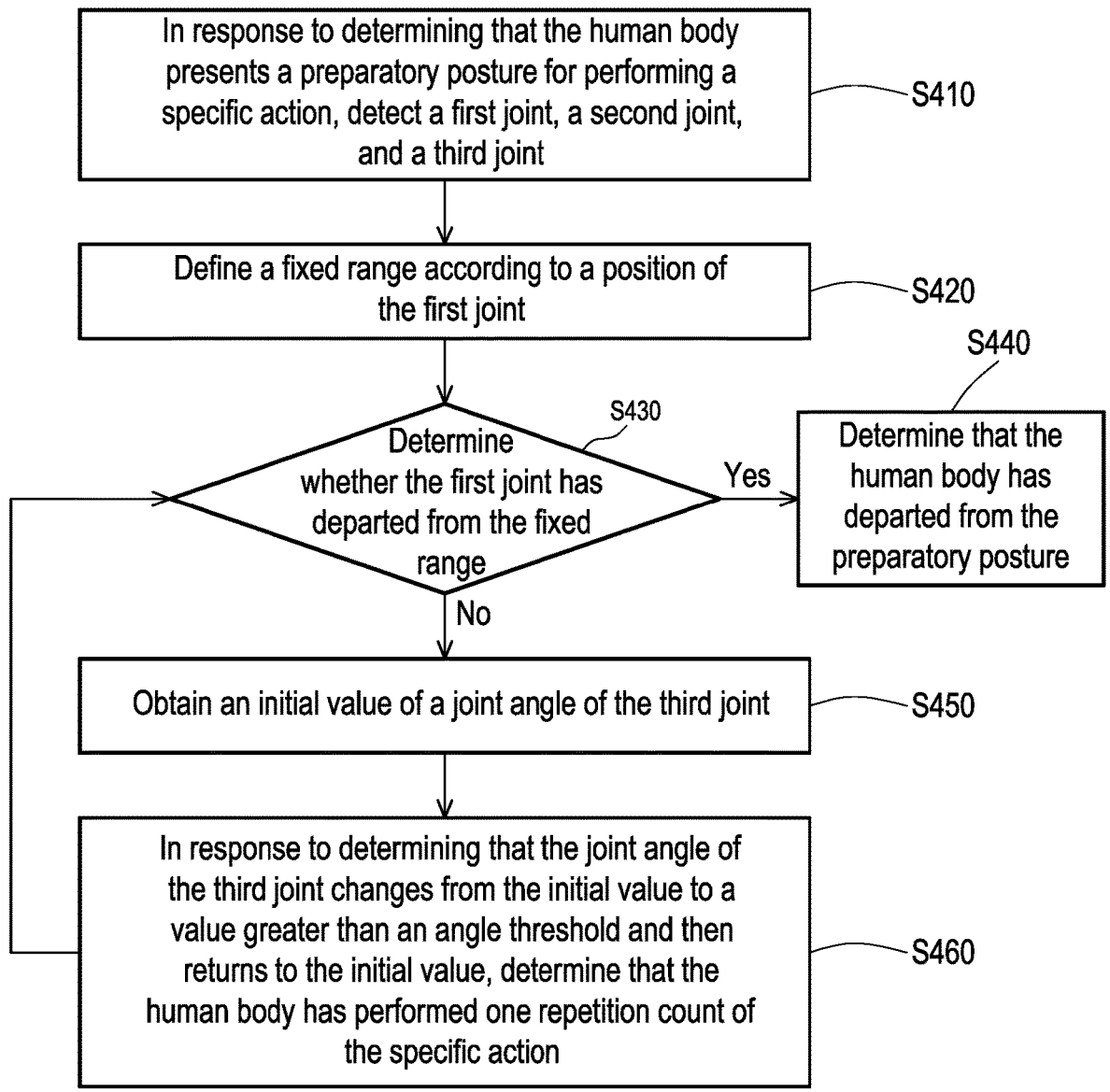
FIG. 4 is a flowchart of determining performing a specific action by a human body illustrated according to an embodiment of the invention.
Figure 5:
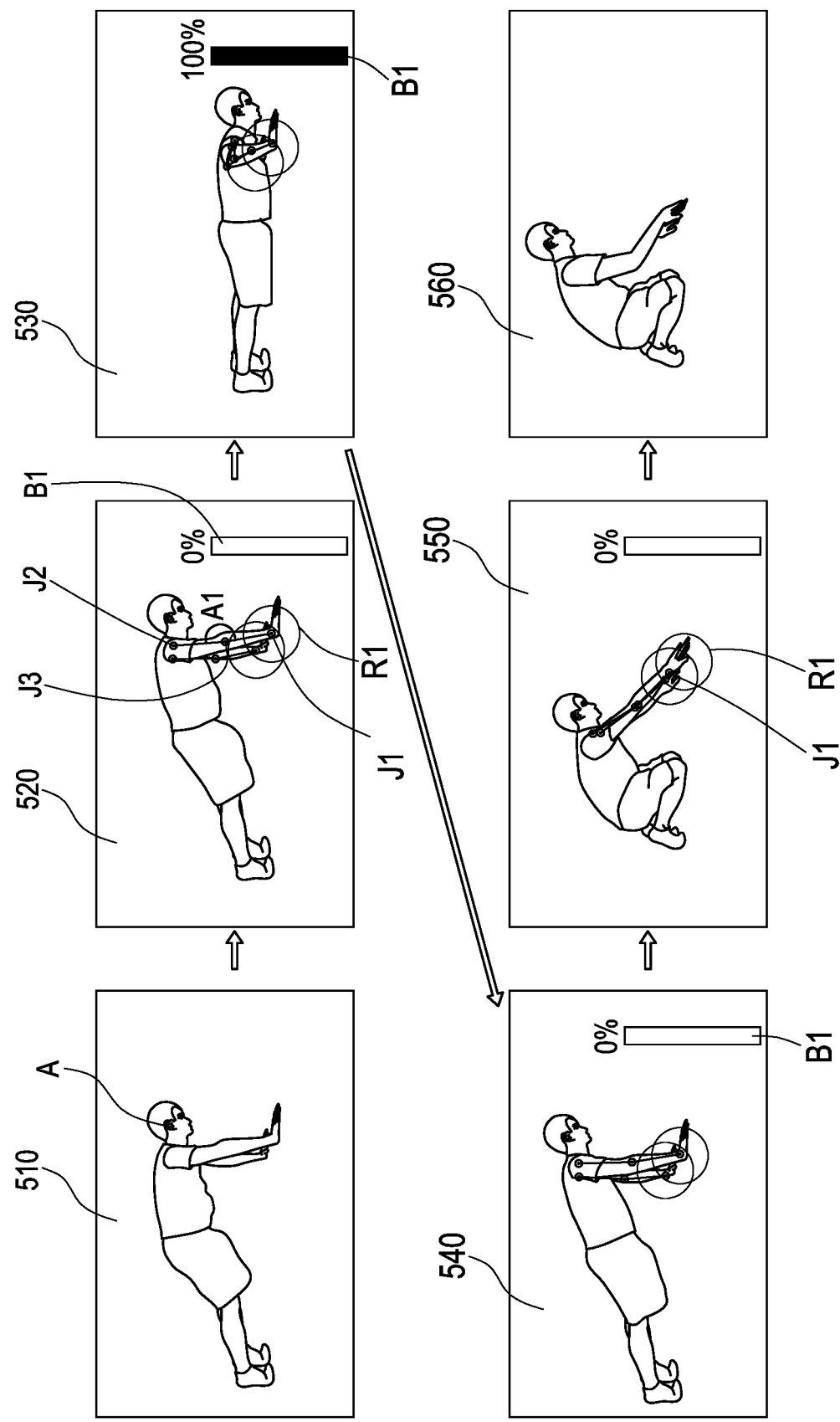
FIG. 5 is an application scenario diagram illustrated according to an embodiment of the invention.

With reference to FIG. 4, FIG. 4 is a flowchart of determining performing a specific action by a human body illustrated according to an embodiment of the invention. The method of this embodiment may be performed by the human body detection device 100 of FIG. 1. Details of each step of FIG. 4 accompanied with the elements shown in FIG. 1 will now be described below. In addition, to make the concepts of FIG. 4 more comprehensible, description with the aid of the content of FIG. 5 will be made below. FIG. 5 is an application scenario diagram illustrated according to an embodiment of the invention.

In this embodiment, the processor 104 may first determine whether the human body A presents a preparatory posture for performing the specific action. In the scenario of FIG. 5, since the specific action taken into consideration is push-ups, the preparatory posture is, for example, the action shown in an image frame 510. In an embodiment, the processor 104 may determine that the human body A in the image frame 510 has presented the preparatory posture of the specific action through any known manner of image recognition. In another embodiment, the processor 104 may first determine the preparatory posture presented by the human body A, determine the corresponding specific action according to the determined preparatory posture, and then perform methods and steps corresponding to the specific action according to the determined specific action. For example, in the scenario of FIG. 5, after determining that the user performs the action shown in the image frame 510, the processor 104 may determine that the specific action intended to be performed by the user is push-ups according to the action shown in the image frame 510, and then perform the subsequent methods and steps corresponding to push-ups.

Based on this, in step S410, in response to determining that the human body A presents the preparatory posture for performing the specific action, the processor 104 detects a first joint J1, a second joint J2, and a third joint J3 as shown in an image frame 520. In an embodiment, the processor 104 may detect the first joint J1, the second joint J2, and the third joint J3 in the image frame 520, for example, based on the above-mentioned technical means, but not limited thereto.

In an embodiment, the first joint J1 is connected to the second joint J2 through the third joint J3. In the scenario of FIG. 5, the first joint J1, the second joint J2, and the third joint J3 are respectively the wrist joint, the shoulder joint, and the elbow joint, for example. A position of the first joint J1 is substantially fixed during performing the specific action by the human body A. That is, the position of the first joint J1 does not change in response to performing the specific action (i.e., push-ups) by the human body A. Based on this, in the invention, it may be determined whether the human body A has departed from the preparatory posture of the specific action based on the position of the first joint J1.

Specifically, after detecting the first joint J1, the processor 104 performs step S420 to define a fixed range R1 according to the position of the first joint J1. The position and size of the fixed range R1 are fixed after being defined. In an embodiment, the processor 104 may determine the position of R1, for example, by taking the position of the first joint J1 as the center of the circle, and then determines the fixed range R1 based on a certain radius (e.g., the length of palm of the human body A or the height of the human body A, or R1 has a fixed radius). Nonetheless, the invention is not limited thereto.

In this embodiment, since the exercise is push-ups, the wrist joint is thus taken as the first joint J1 to define the fixed range R1. In other embodiments, if the exercise is squats, the ankle joint may be taken as the first joint J1 to define the fixed range R1; if the exercise is pull-ups, the wrist joint may be taken as the first joint J1 to define the fixed range R1; and if the exercise is sit-ups or crunches, the hip joint may be taken as the first joint J1 to define the fixed range R1. Nonetheless, the invention is not limited thereto.

After that, in step S430, the processor 104 determines whether the first joint J1 has departed from the fixed range R1. As mentioned earlier, since the position of the first joint J1 is fixed during performing the specific action by the human body A, when determining that the first joint J1 has departed from the fixed range R1, the processor 104 may perform step S440 to determine that the human body A has departed from the preparatory posture (e.g., temporarily not performing the specific action).

In addition, if the processor 104 determines that the first joint J1 has not departed from the fixed range R1, the processor 104 may perform step S450 to obtain an initial value (e.g., 170 degrees) of a joint angle A1 of the third joint J3. In the scenario of FIG. 5, the joint angle A1 of the third joint J3 (i.e., the elbow joint) may change in response to performing the specific action by the human body A. For example, when the human body A performs an eccentric phase (i.e., lowering down) of push-ups, the joint angle A1 of the third joint J3 may gradually decrease from the initial value, and when the human body A performs a concentric phase (i.e., lifting up) of push-ups, the joint angle A1 of the third joint J3 increases accordingly.

Therefore, in the method of the invention, it may be determined whether the human body A has performed one repetition count of the specific action based on the change of the joint angle A1 of the third joint J3. In an embodiment, the processor 104 may determine whether the joint angle A1 of the third joint J3 changes from the initial value to a value less than an angle threshold and then returns to the initial value.

In the scenario of FIG. 5, the change of the joint angle A1 of the third joint J3 in each image frame may be represented by a corresponding progress bar. For example, in the image frame 520, assuming that the joint angle A1 of the third joint J3 is at the initial value, then a progress bar B1 in the image frame 520 may, for example, be presented as 0% to indicate that the joint angle A1 of the third joint J3 has not changed.

In addition, when the human body A undergoes the eccentric phase of the specific action, the progress bar B1 increases as the joint angle A1 of the third joint J3 gradually approaches the angle threshold (e.g., 90 degrees). When the joint angle A1 of the third joint J3 changes to a value not greater than the angle threshold, the progress bar B1 may, for example, be presented as 100% as shown in an image frame 530.

Besides, when the human body A undergoes the concentric phase of the specific action, the progress bar B1 decreases as the joint angle A1 of the third joint J3 gradually approaches the initial value. When the joint angle A1 of the third joint J3 is restored to be not less than the initial value, the progress bar B1 may, for example, be restored to 0% as shown in an image frame 540.

It can be seen from the above that during performing one repetition count of the specific action (e.g., performing one push-up) by the human body A, the joint angle A1 of the third joint J3 accordingly changes from the initial value to a value greater than the angle threshold and then returns to the initial value. Based on this, in step S460, in response to determining that the joint angle A1 of the third joint J3 changes from the initial value to a value greater than the angle threshold and then returns to the initial value, the processor 104 may accordingly determine that the human body A has performed one repetition count of the specific action, and may return to step S430.

Based on the above principles, the processor 104 may estimate the number of repetition counts of performing the specific action by the human body A from presenting the preparatory posture to departing from the preparatory posture, as the number of repetition counts of performing one set of the specific action by the human body A.

In the scenario of FIG. 5, assuming that the human body A has completed the required number of repetition counts, the human body A may get up accordingly. In this case, the processor 104 may determine that the human body has departed from the preparatory posture for detecting that the position of the first joint J1 has departed from the fixed range R1 as shown in image frames 550 and 560. After that, the processor 104 may determine that the human body A has completed one set, and keep records accordingly. Nonetheless, the invention is not limited thereto. In an embodiment, the number of sets of exercise may be calculated and recorded utilizing the number of times of determining that the human body enters the preparatory posture and departs from the preparatory posture.

Besides, it can be seen from FIG. 5 that during performing the specific action by the human body A, a distance between the second joint J2 (i.e., the shoulder joint) and a certain reference position changes accordingly. In an embodiment, the reference position is, for example, the top of the image frame, the bottom of the image frame, R1, the ankle of the user, and so on. Nonetheless, the invention is not limited thereto.

In an embodiment, in response to determining that the human body A presents the preparatory posture for performing the specific action, the processor 104 may detect a change in the distance between the second joint J2 and the reference position.

For example, in the image frame 520, when the human body A is in the preparatory posture, the processor 104 may detect the distance between the second joint J2 and the reference position (e.g., the top of the image frame 520). At this time, the distance between the second joint J2 and the top of the image frame 520 is relatively close. When the human body A performs the eccentric phase of the specific action, the distance between the second joint J2 and the top of the image frame gradually increases. In addition, when the human body A performs the concentric phase of the specific action, the distance between the second joint J2 and the top of the image frame gradually decreases. Based on this, the processor 104 may record the change in the distance between the second joint J2 and the top of the image frame as a posture change signal when the human body A performs the specific action. After that, the processor 104 may, for example, perform other analysis/processing based on the posture change signal. Nonetheless, the invention is not limited thereto.

Figure 6:
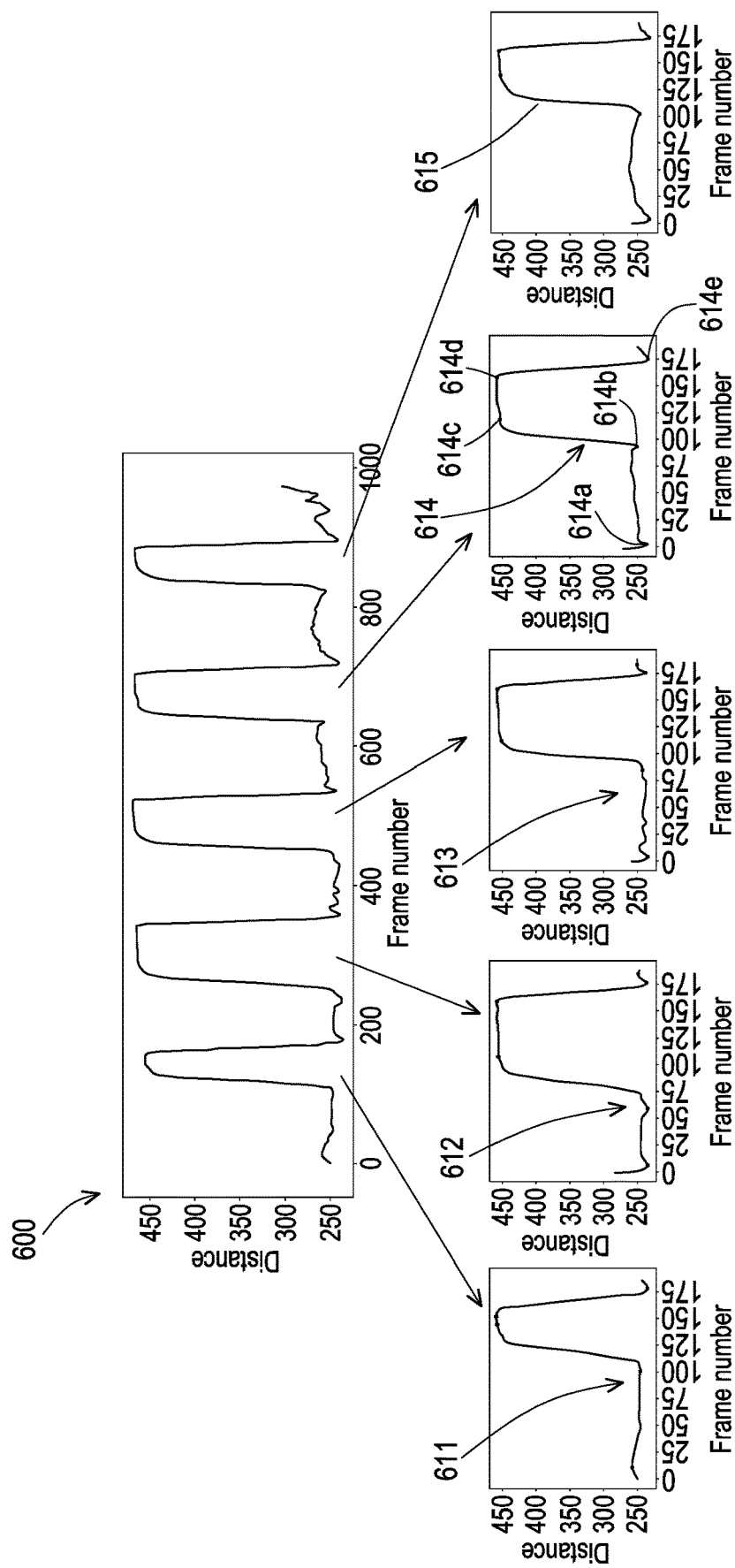
FIG. 6 is a schematic diagram of the posture change signal illustrated according to FIG. 5.

With reference to FIG. 6, FIG. 6 is a schematic diagram of the posture change signal illustrated according to FIG. 5. In this embodiment, a posture change signal 700, for example, shows the change in the distance between the second joint J2 and the top of the image frame in FIG. 5. In FIG. 6, it is assumed that the human body A performs 5 repetitions of the specific action (e.g., 5 push-ups) in total. Since the processor 104 may determine the performing of each repetition count of the specific action by the human body A according to the previous teachings, the processor 104 may accordingly extract a posture change signal section corresponding to each repetition count of the specific action from the posture change signal 600.

For example, in the scenario of FIG. 6, assuming that the processor 104 determines that the image frames from a 1st image frame to a 180th image frame correspond to performing a first repetition of the specific action by the human body A, then the processor 104 may extract the part corresponding to the 1st image frame to the 180th image frame in the posture change signal 600 as a posture change signal section 611 corresponding to the first repetition of the specific action. For another example, assuming that the processor 104 determines that the image frames from a 181st image frame to a 280th image frame correspond to performing a second repetition of the specific action by the human body A, then the processor 104 may extract the part corresponding to the 181st image frame to the 280th image frame in the posture change signal 600 as a posture change signal section 612 corresponding to the second repetition of the specific action. Based on similar principles, the processor 104 may extract posture change signal sections 613 to 615 corresponding to a third repetition, a fourth repetition, and a fifth repetition of the specific action from the posture change signal 600. Nonetheless, the invention is not limited thereto.

After that, the processor 104 may estimate a corresponding two-dimensional movement speed based on each of the posture change signal sections 613 to 615. In an embodiment, the processor 104 may obtain the two-dimensional movement speed based on the method of FIG. 7.

Figure 7:
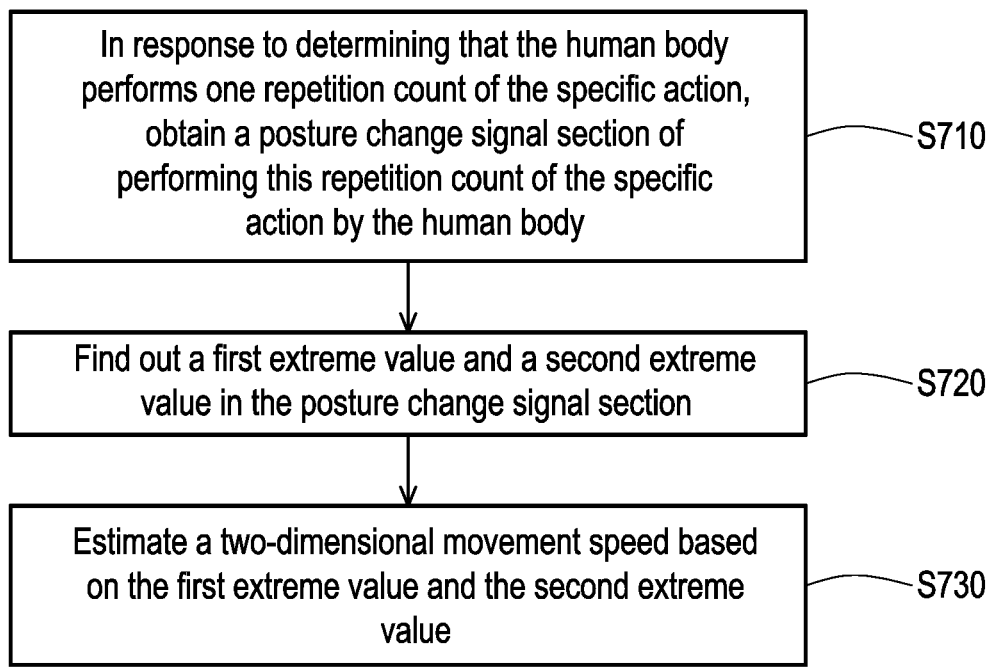
FIG. 7 is a flowchart of a method of obtaining a two-dimensional movement speed illustrated according to an embodiment of the invention.

With reference to FIG. 7, FIG. 7 is a flowchart of a method of obtaining a two-dimensional movement speed illustrated according to an embodiment of the invention. The method of this embodiment may be performed by the human body detection device 100 of FIG. 1. Details of each step of FIG. 7 accompanied with the elements shown in FIG. 1 will now be described below.

First, in step S710, in response to determining that the human body A performs one repetition count of the specific action, the processor 104 obtains a posture change signal section of performing this repetition count of the specific action by the human body A. For ease of description, it is assumed in the following that the posture change signal section taken into consideration is the posture change signal section 614 in FIG. 6 (which corresponds to the fourth repetition of the specific action), but not limited thereto. In other embodiments, based on the following teachings, those ordinarily skilled in this field should be accordingly able to understand operations performed by the processor 104 based on other posture change signal sections.

In step S720, the processor 104 finds out a first extreme value and a second extreme value in the posture change signal section 614. In an embodiment, during step S720, the processor 104 may find out a plurality of extreme values 614a to 614e in the posture change signal section 614. In an embodiment, the processor 104 may find out the extreme values 614a to 614e, for example, by taking the second derivative of the posture change signal section 614. Nonetheless, the invention is not limited thereto.

After that, the processor 104 may find out the first extreme value and the second extreme value in the extreme values 614a to 614e. In an embodiment, in response to determining that an absolute difference between a $j^{th}$ extreme value and a $j+1^{th}$ extreme value in the extreme values 614a to 614e is greater than a predetermined threshold, and that a change between the $j^{th}$ extreme value and the $j+1^{th}$ extreme value corresponds to the concentric phase of the specific action, namely a distance between the $j+1^{th}$ extreme value and the top of the image frame is less than a distance between the $j^{th}$ extreme value and the top of the image frame in this embodiment of push-ups, the processor 104 may determine that the $j^{th}$ extreme value and the $j+1^{th}$ extreme value are respectively the first extreme value and the second extreme value, where j is an index.

In different embodiments, the predetermined threshold may be set to a value that is large enough by the designer depending on requirements, or may be automatically set according to the height of the bounding box 330 of the human body A or the actual height of the user, or according to the distance between the coordinates of or the actual length between the first and second joints of the user (e.g., the arm length between the shoulder joint and the wrist joint). Nonetheless, the invention is not limited thereto. In the posture change signal section 614, assuming that an absolute difference between the extreme values 614d and 614e is greater than the predetermined threshold, then the processor 104 may determine that the extreme values 614d and 614e are respectively the first extreme value and the second extreme value in the posture change signal section 614.

After obtaining the first extreme value and the second extreme value, in step S730, the processor 104 estimates the two-dimensional movement speed based on the first extreme value and the second extreme value. In an embodiment, the processor 104 may obtain a first frame and a second frame respectively corresponding to the first extreme value and the second extreme value; obtain a frame number difference between the first frame and the second frame, and estimate a time difference between the first extreme value and the second extreme value based on a frame rate and the frame number difference; and obtain an absolute difference between the first extreme value and the second extreme value, and estimate the two-dimensional movement speed based on the absolute difference and the time difference.

In FIG. 6, the extreme values 614d and 614e respectively correspond to the 170th frame and the 185th frame of the posture change signal section 614, for example. Therefore, the processor 104 may respectively regard the 170th frame and the 185th frame of the posture change signal section 614 as the first frame and the second frame taken into consideration. After that, the processor 104 may obtain the frame number difference (e.g., 15 frames) between the first frame and the second frame. Then, the processor 104 may estimate a time difference between the extreme values 614d and 614e based on a frame rate (e.g., the image capturing frame rate of the image capturing circuit 102) and the frame number difference.

In an embodiment, the processor 104 may, for example, divide the frame number difference by the frame rate to estimate the time difference between the extreme values 614d and 614e. After that, the processor 104 may obtain the absolute difference between the extreme values 614d and 614e, and estimate the two-dimensional movement speed based on the absolute difference and the time difference. In an embodiment, the processor 104 may, for example, divide the absolute difference between the extreme values 614d and 614e by the time difference to estimate the two-dimensional movement speed corresponding to the posture change signal section 614.

In an embodiment, after obtaining the two-dimensional movement speed corresponding to the posture change signal section 614, the processor 104 may further estimate a three-dimensional movement speed corresponding to the posture change signal section 614. Relevant details will be further described with the aid of FIG. 8.

Figure 8:
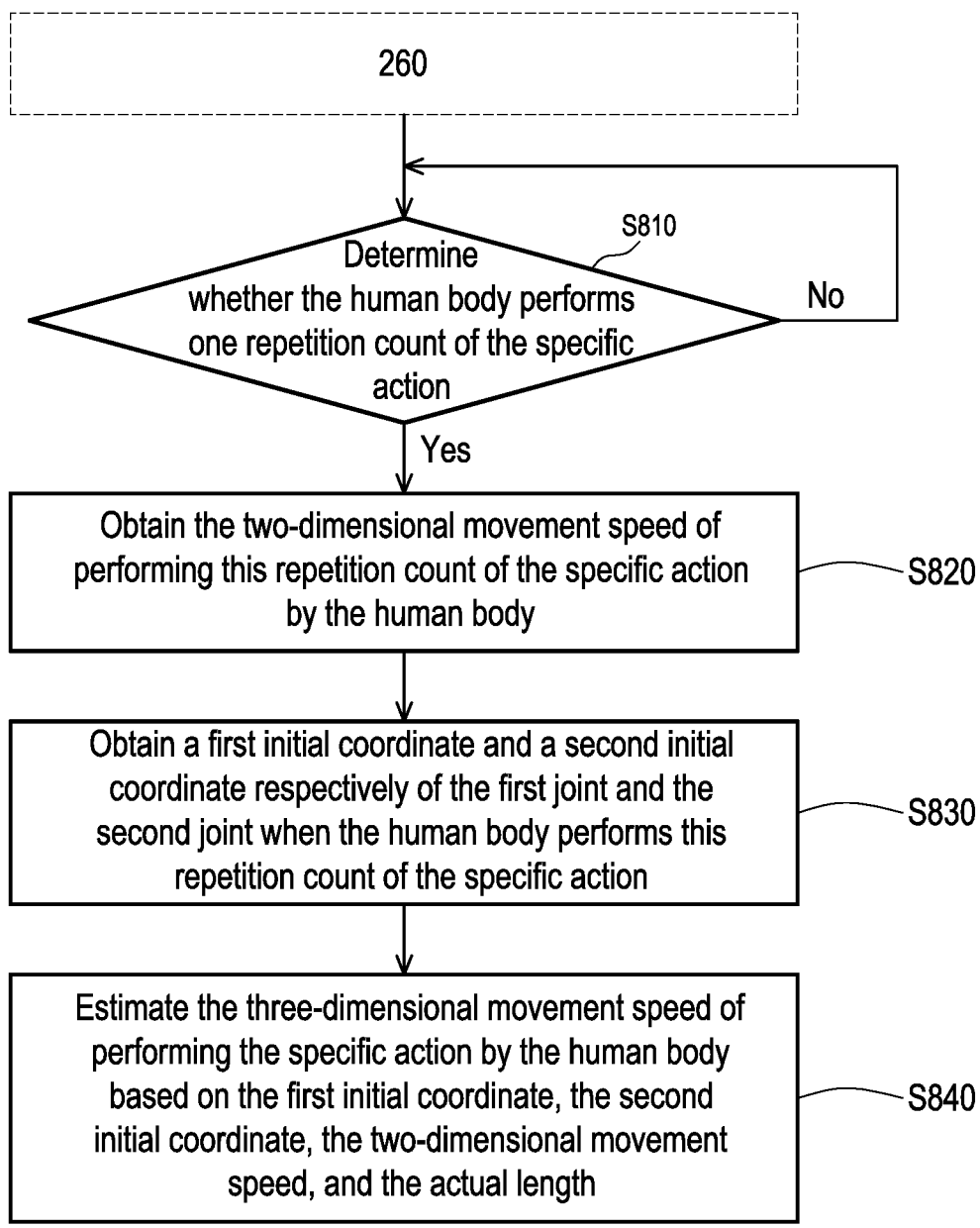
FIG. 8 is a flowchart of estimating a three-dimensional movement speed illustrated according to an embodiment of the invention.

With reference to FIG. 8, FIG. 8 is a flowchart of estimating a three-dimensional movement speed illustrated according to an embodiment of the invention. The method of this embodiment may be performed by the human body detection device 100 of FIG. 1. Details of each step of FIG. 8 accompanied with the elements shown in FIG. 1 will now be described below.

In an embodiment, the method of FIG. 8 may be performed after step S260 of FIG. 1. In this embodiment, it is assumed that the specific action taken into consideration are push-up as shown in FIG. 5, but not limited thereto.

First, in step S810, the processor 104 determines whether the human body A performs one repetition count of the specific action. If yes, the processor 104 subsequently perform step S820 to obtain the two-dimensional movement speed of performing this repetition count of the specific action by the human body. In this embodiment, reference may be made to the description of the above embodiments for the details of steps S810 and S820, which will not be repeatedly described here.

Besides, for ease of comprehension, it is assumed in the following that the two-dimensional movement speed obtained in step S820 corresponds to the two-dimensional movement speed of the posture change signal section 614 in FIG. 6, but not limited thereto.

Based on this, in step S830, the processor 104 respectively obtains a first initial coordinate of the first joint J1 and a second initial coordinate of the second joint J2 of the human body A performing this repetition count of the specific action. For example, the processor 104 may obtain the first initial coordinate and the second initial coordinate of the first joint J1 and the second joint J2 of the human body A in the corresponding image frame when the human body A performs the fourth repetition of the specific action.

After that, in step S840, the processor 104 estimates the three-dimensional movement speed of performing the specific action by the human body A based on the first initial coordinate, the second initial coordinate, the two-dimensional movement speed, and the actual length.

In an embodiment, the three-dimensional movement speed (represented by $v_{3D}$) corresponding to the posture change signal section 614 may, for example, be represented as $$"v_{3D} = \left(\frac{v_{2D}}{L} \times L_{1,2}\right) / 100",$$

where $v_{2D}$ is, for example, the two-dimensional movement speed corresponding to the posture change signal section 614, L is a distance between the first initial coordinate and the second initial coordinate, and $L_{1,2}$ is the actual length between the first joint J1 and the second joint J2.

In other embodiments, based on those taught above, the processor 104 may accordingly estimate the two-dimensional movement speed and the three-dimensional movement speed corresponding to the other posture change signal sections 611, 612, 614, and 615. Nonetheless, the invention is not limited thereto.

In other embodiments, based on the two-dimensional movement speed and the three-dimensional movement speed of the posture change that are estimated, with reference to other physiological parameters and/or other values (e.g., weights in weight training) input by the user, the processor 104 may further estimate the energy consumed by the user, the remaining physical strength, or like. Nonetheless, the invention is not limited thereto.

The invention also provides a computer readable storage medium for performing the human body detection method. The computer readable storage medium is composed of multiple programming commands (programming commands such as set or deploy). The programming commands may be loaded into the human body detection device 100 for execution to perform the functions of the human body detection method and the human body detection device 100 described above.

In summary of the foregoing, in the method of the invention, after the human body is determined to be stable in the specific posture (e.g., the natural standing posture or other postures required by the designer), the actual length between the first and second joints may be estimated accordingly. Thereby, subsequent detection on various motions (e.g., the three-dimensional movement speed of performing each repetition count of the specific action) of the human body can be made more accurate, and the effect of detection can be enhanced.

Although the invention has been disclosed as embodiment as above, it is not used to limit the invention, anyone with ordinary knowledge in the technical field can make some changes and modifications without departing from the spirit and scope of the invention, therefore, the scope of protection of the invention shall be subject to the scope of the attached patent application.

What is claimed is:

1. A human body detection method, adapted for a human body detection device, and comprising:
   obtaining a plurality of image frames related to a human body;
   detecting a plurality of joint coordinates of the human body in each of the image frames, and accordingly finding out a plurality of specific image frames in the image frames, wherein the human body is determined to be in a specific posture in each of the specific image frames;
   obtaining an image region height corresponding to the human body in each of the specific image frames;
   obtaining a first joint coordinate of a first joint of the human body in each of the specific image frames;
   obtaining a second joint coordinate of a second joint of the human body in each of the specific image frames;
   estimating an actual length between the first joint and the second joint based on a height of the human body and the image region height, the first joint coordinate, and the second joint coordinate in each of the specific image frames, wherein the height of the human body is a real height of the human body in a real world, and the actual length is a length between the first joint and the second joint in the real world;
   in response to determining that the human body performs one repetition count of a specific action, obtaining a two-dimensional movement speed of performing the one repetition count of the specific action by the human body, comprising:
      obtaining a posture change signal section of performing the repetition count of the specific action by the human body;
      finding out a first extreme value and a second extreme value in the posture change signal section; and
      estimating the two-dimensional movement speed based on the first extreme value and the second extreme value;
   respectively obtaining a first initial coordinate of the first joint and a second initial coordinate of the second joint of the human body performing the one repetition count of the specific action; and
   estimating a three-dimensional movement speed of performing the specific action by the human body based on the first initial coordinate, the second initial coordinate, the two-dimensional movement speed, and the actual length.

2. The method as described in claim 1, wherein the step of detecting the joint coordinates of the human body in each of the image frames, and accordingly finding out the specific image frames in the image frames comprises:
   inputting a first image frame of the image frames into at least one pre-trained human body detection model, wherein the at least one human body detection model detects the joint coordinates of the human body in the first image frame, and accordingly outputs a probability that the human body is in the specific posture in the first image frame;

in response to determining that the probability is higher than a probability threshold, determining that the first image frame belongs to the specific image frames; and in response to determining that the probability is not higher than the probability threshold, determining that the first image frame does not belong to the specific image frames.

3. The method as described in claim 1, wherein before the step of estimating the actual length between the first joint and the second joint based on the height of the human body and the image region height, the first joint coordinate, and the second joint coordinate in each of the specific image frames, the method further comprises:

obtaining a specific ratio of the specific image frames to the image frames; and in response to determining that the specific ratio is higher than a ratio threshold, estimating the actual length between the first joint and the second joint based on the height of the human body and the image region height, the first joint coordinate, and the second joint coordinate in each of the specific image frames.

4. The method as described in claim 3, wherein the image frames comprise an $i^{th}$ image frame to an $i+N-1^{th}$ image frame, and the method further comprises:

in response to determining that the specific ratio is not higher than the ratio threshold, re-determining the specific image frames based on an $i+1^{th}$ image frame to an $i+N^{th}$ image frame, where N is a positive integer.

5. The method as described in claim 1, wherein the step of estimating the actual length between the first joint and the second joint based on the height of the human body and the image region height, the first joint coordinate, and the second joint coordinate in each of the specific image frames comprises:

obtaining an average height of the image region height in each of the specific image frames;

obtaining a first average coordinate of the first joint coordinate in each of the specific image frames;

obtaining a second average coordinate of the second joint coordinate in each of the specific image frames; and estimating the actual length between the first joint and the second joint based on the height of the human body, the average height, the first average coordinate, and the second average coordinate.

6. The method as described in claim 5, wherein the actual length between the first joint and the second joint is represented as:

$$L_{1,2} = \frac{D(P1_{av}, P2_{av})}{H_{av}} \times UH,$$

where $P1_{av}$ is the first average coordinate, $P2_{av}$ is the second average coordinate, $H_{av}$ is the average height, UH is the height of the human body, and $D(P1_{av}, P2_{av})$ is a distance between the first average coordinate and the second average coordinate.

7. The method as described in claim 1, wherein the step of obtaining the posture change signal section of performing the one repetition count of the specific action by the human body comprises:

in response to determining that the human body presents a preparatory posture for performing the specific action, detecting a change in a distance between the second joint and a reference position; and in response to determining that the human body performs the one repetition count of the specific action, obtaining the corresponding change in the distance as the posture change signal section of performing the one repetition count of the specific action by the human body.

8. The method as described in claim 1, wherein the step of finding out the first extreme value and the second extreme value in the posture change signal section comprises:

finding out a plurality of extreme values in the posture change signal section; and in response to determining that an absolute difference between a $j^{th}$ extreme value and a j+1th extreme value in the extreme values is greater than a predetermined threshold and a change between the $j^{th}$ extreme value and the j+1th extreme value corresponds to a concentric phase of the specific action, determining that the $j^{th}$ extreme value and the j+1th extreme value are respectively the first extreme value and the second extreme value, where j is an index.

9. The method as described in claim 1, wherein the step of estimating the two-dimensional movement speed based on the first extreme value and the second extreme value comprises:

obtaining a first frame and a second frame respectively corresponding to the first extreme value and the second extreme value;

obtaining a frame number difference between the first frame and the second frame, and estimating a time difference between the first extreme value and the second extreme value based on a frame rate and the frame number difference; and obtaining an absolute difference between the first extreme value and the second extreme value, and estimating the two-dimensional movement speed based on the absolute difference and the time difference.

10. The method as described in claim 1, wherein the three-dimensional movement speed is represented as:

$$v_{3D} = \left(\frac{v_{2D}}{L} \times L_{1,2}\right) / 100,$$

where $v_{2D}$ is the two-dimensional movement speed, L is a distance between the first initial coordinate and the second initial coordinate, and $L_{1,2}$ is the actual length between the first joint and the second joint.

11. The method as described in claim 1, further comprising:

in response to determining that the human body presents a preparatory posture for performing the specific action, detecting the first joint, the second joint, and a third joint, wherein the first joint is connected to the second joint through the third joint, and a joint angle of the third joint changes in response to performing the specific action by the human body;

obtaining an initial value of the joint angle of the third joint; and in response to determining that the joint angle of the third joint changes from the initial value to a value not greater than an angle threshold and then returns to the initial value, determining that the human body has performed one repetition count of the specific action.

12. The method as described in claim 11, wherein after the step of detecting the first joint, the second joint, and the third joint, the method further comprises:

defining a fixed range according to a position of the first joint, wherein the position of the first joint is fixed during performing the specific action by the human body; and in response to determining that the first joint has departed from the fixed range, determining that the human body has departed from the preparatory posture.

13. A human body detection device, comprising:

an image capturing circuit for obtaining a plurality of image frames related to a human body;

a processor coupled to the image capturing circuit and configured to:
- detect a plurality of joint coordinates of the human body in each of the image frames, and accordingly finding out a plurality of specific image frames in the image frames, wherein the human body is determined to be in a specific posture in each of the specific image frames;
- obtain an image region height corresponding to the human body in each of the specific image frames;
- obtain a first joint coordinate of a first joint of the human body in each of the specific image frames;
- obtain a second joint coordinate of a second joint of the human body in each of the specific image frames;
- estimate an actual length between the first joint and the second joint based on a height of the human body and the image region height, the first joint coordinate, and the second joint coordinate in each of the specific image frames, wherein the height of the human body is a real height of the human body in a real world, and the actual length is a length between the first joint and the second joint in the real world;
- in response to determining that the human body performs one repetition count of a specific action, obtaining a two-dimensional movement speed of performing the one repetition count of the specific action by the human body, comprising:
  - obtaining a posture change signal section of performing the repetition count of the specific action by the human body;
  - finding out a first extreme value and a second extreme value in the posture change signal section; and
  - estimating the two-dimensional movement speed based on the first extreme value and the second extreme value;
- respectively obtaining a first initial coordinate of the first joint and a second initial coordinate of the second joint of the human body performing the one repetition count of the specific action; and
- estimating a three-dimensional movement speed of performing the specific action by the human body based on the first initial coordinate, the second initial coordinate, the two-dimensional movement speed, and the actual length.

14. A non-transitory computer readable storage medium, wherein the non-transitory computer readable storage medium records an executable computer program, and the executable computer program is loaded by a human body detection device to perform the following steps:

obtaining a plurality of image frames related to a human body;

detecting a plurality of joint coordinates of the human body in each of the image frames, and accordingly finding out a plurality of specific image frames in the image frames, wherein the human body is determined to be in a specific posture in each of the specific image frames;

obtaining an image region height corresponding to the human body in each of the specific image frames;

obtaining a first joint coordinate of a first joint of the human body in each of the specific image frames;

obtaining a second joint coordinate of a second joint of the human body in each of the specific image frames;

estimating an actual length between the first joint and the second joint based on a height of the human body and the image region height, the first joint coordinate, and the second joint coordinate in each of the specific image frames, wherein the height of the human body is a real height of the human body in a real world, and the actual length is a length between the first joint and the second joint in the real world;

in response to determining that the human body performs one repetition count of a specific action, obtaining a two-dimensional movement speed of performing the one repetition count of the specific action by the human body, comprising:
- obtaining a posture change signal section of performing the repetition count of the specific action by the human body;
- finding out a first extreme value and a second extreme value in the posture change signal section; and
- estimating the two-dimensional movement speed based on the first extreme value and the second extreme value;

respectively obtaining a first initial coordinate of the first joint and a second initial coordinate of the second joint of the human body performing the one repetition count of the specific action; and estimating a three-dimensional movement speed of performing the specific action by the human body based on the first initial coordinate, the second initial coordinate, the two-dimensional movement speed, and the actual length.

* * * * *